D. CLERK.
INTERNAL COMBUSTION ENGINE WORKING WITH COKE OVEN AND OTHER GASES.
APPLICATION FILED JAN. 31, 1913.
1,158,179.
Patented Oct. 26, 1915.
Fig. 1.
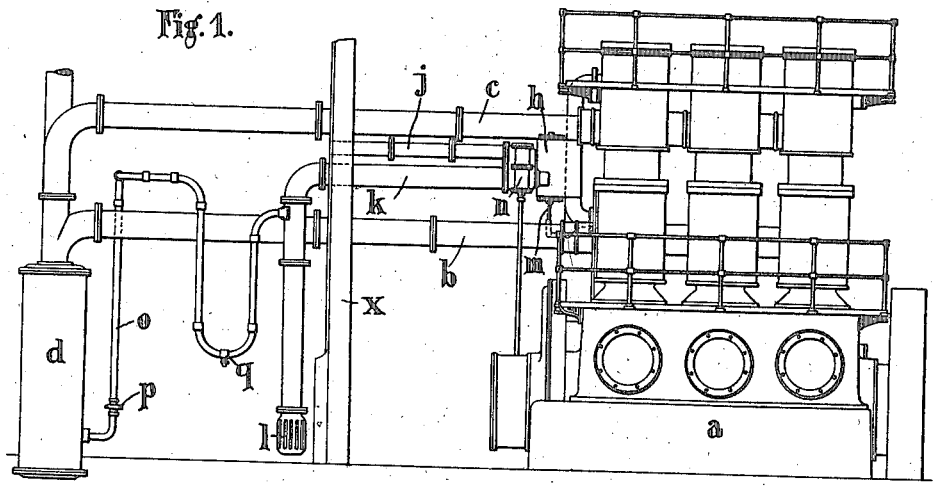
Fig. 3.
Fig. 4.
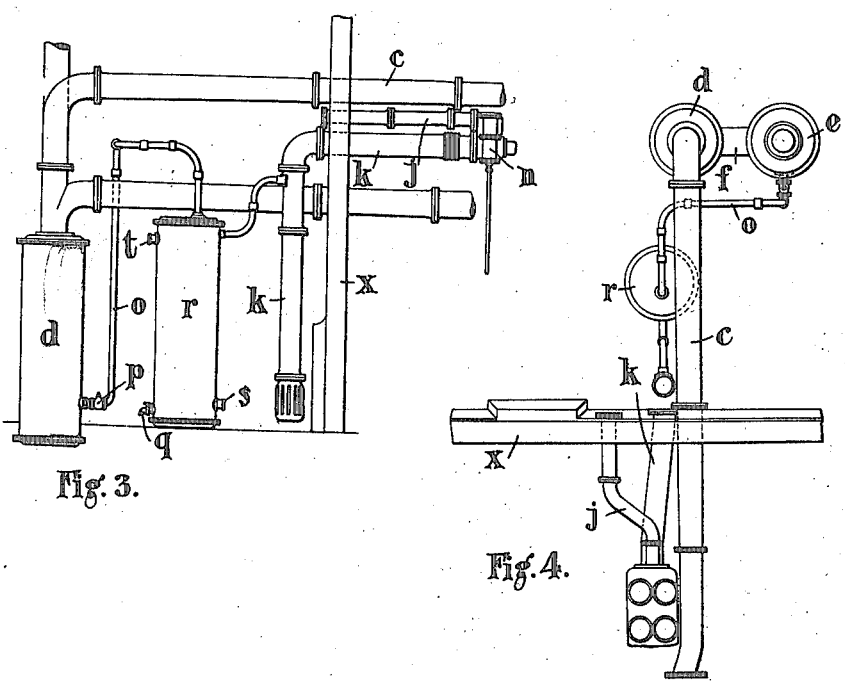
WITNESSES
INVENTOR
Dugald Clerk
BY
ATTORNEY

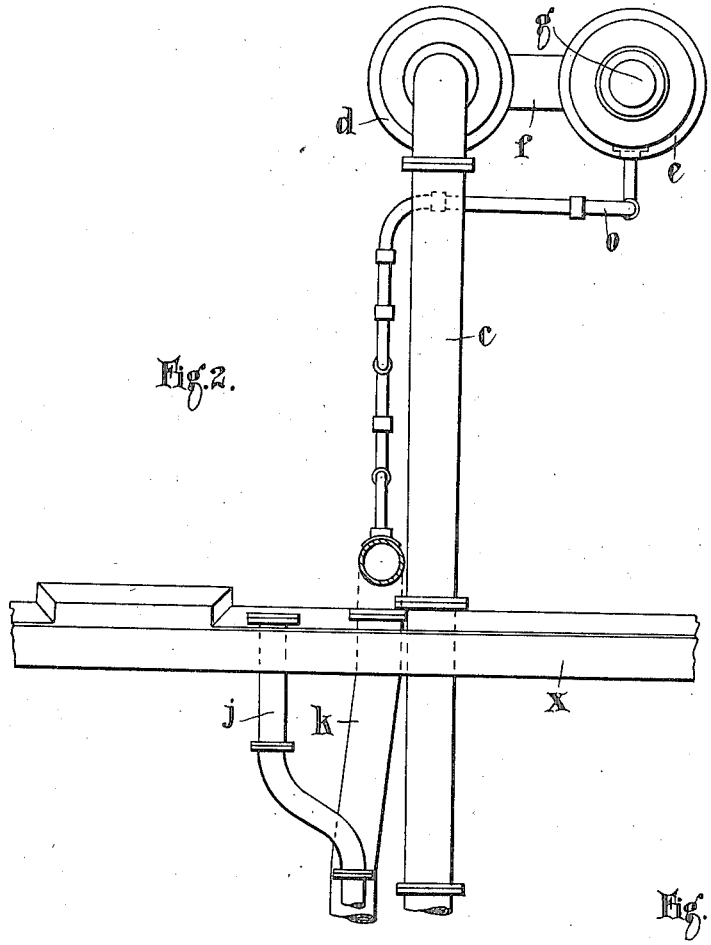
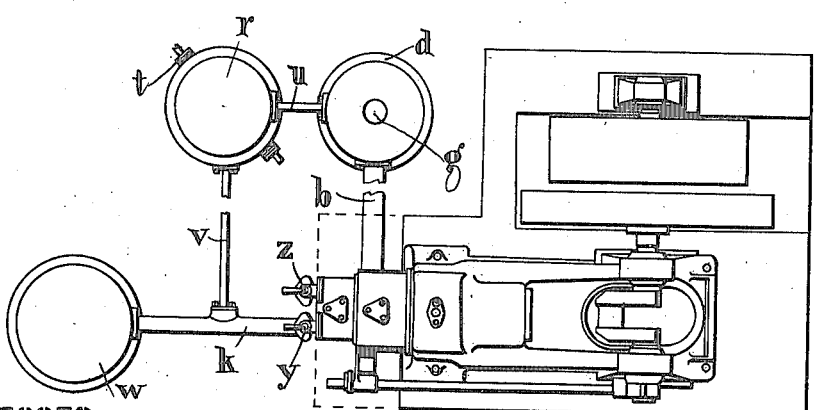

UNITED STATES PATENT OFFICE.

DUGALD CLERK, OF LONDON, ENGLAND, ASSIGNOR TO THE NATIONAL GAS ENGINE COMPANY LIMITED, OF ASHTON-UNDER-LYNE, ENGLAND.

INTERNAL-COMBUSTION ENGINE WORKING WITH COKE-OVEN AND OTHER GASES.

1,158,179. Specification of Letters Patent. Patented Oct. 26, 1915.

Application filed January 31, 1913. Serial No. 745,483.

*To all whom it may concern:*

Be it known that I, DUGALD CLERK, a subject of the King of Great Britain and Ireland, and residing at 58 Lincoln's Inn Fields, London, W. C., England, have invented certain new and useful Improvements in Internal-Combustion Engines Working with Coke-Oven and other Gases, of which the following is a specification.

Internal combustion engines using coke-oven gas are liable to frequent pre-ignitions, due to the high hydrogen contents of the gas.

The object of this invention is to avoid pre-ignitions in such engines when using coke-oven or other gas or vapor containing a high percentage of hydrogen.

The invention consists in introducing cooled exhaust gases to the charge inlet pipe so that the oxygen contents of the entering air charge are reduced, and the nitrogen and carbonic acid contents increased. It has been found by experiment that by this means pre-ignitions can be entirely avoided without in any way reducing the power developed by the engine.

In carrying the invention into effect according to one modification, the exhaust gases are cooled by passing through a sufficient length of pipe into a chamber. The pipe and chamber may be either water or air cooled. The pressure in this chamber may be maintained by the discharge from the engine very slightly above atmosphere, and a pipe from the chamber is conducted to the air inlet aperture of the engine. Cooled exhaust gases containing but little oxygen, and consisting mostly of nitrogen and carbonic acid, then pass into the air inlet at atmospheric pressure, and there mix with the air charge entering the engine.

According to another modification of the apparatus, cooled exhaust gas from an existing silencer or exhaust pit is carried to the air inlet by a pipe, and there taken into the engine cylinder.

Referring to the accompanying drawings, Figure 1 shows one form of the invention, as applied to a six-cylinder vertical tandem engine, and in which cooling of the exhaust gases is effected by an exposed pipe of considerable length. Fig. 2 is a plan of Fig. 1, with the engine omitted. Fig. 3 illustrates a modification in which a water cooled chamber is employed to cool the exhaust gases: in this figure the complete engine is not shown. Fig. 4 is a plan of Fig. 3. Fig. 5 illustrates the application of a cooled chamber to the case of a horizontal gas engine.

In carrying the invention into effect according to one form, and as illustrated in Figs. 1 and 2, as applied to a six-cylinder vertical tandem gas engine, the exhaust gases are led from the engine $a$ by way of pipes $b$ and $c$ to the exhaust silencers $d$ and $e$, which are connected in series by the pipe $f$, the gases finally escaping by the upcast pipe $g$. The exhaust silencers are situated without the building in which the engine is housed: $x$ represents the wall of the building. Gas and air are led to the mixing box $h$ upon the engine by way of pipes $j$ and $k$ respectively, the air pipe $k$ being provided with a suitable protecting rose $l$. The conduits $j$ and $k$ are controlled by a suitable regulating valve, for instance, $m$, and a governor valve $n$. From the bottom of the second silencing chamber $e$ a pipe $o$ leads to a suitable point in the inlet pipe $k$. This pipe $o$ is of considerable length, in order to present a large cooling surface to the surrounding atmosphere, and in order to render the arrangement compact, the pipe may be bent into suitable outline, as shown in the drawings. A controlling cock $p$ and suitable drain cock $q$ are provided in the pipe $o$. The dimension of the pipe $o$ and the adjustment of the cock $p$ are such relatively to the dimensions of the air inlet pipe $k$ that the proportion of exhaust gas in the air charge is about 10 per cent., although in some cases, in dealing with certain classes of gas, it is necessary to increase the proportion to 15 or 20 per cent.

In carrying the invention into effect, according to a second modification, and as illustrated in Figs. 3 and 4, a chamber $r$ which is preferably water-cooled, is included in the circuit of the exhaust gases passing from the silencer $e$ to the air pipe $k$. Suitable water inlets and outlets $s$ and $t$ may be provided upon the chamber $r$, and a drain cock $q$ is provided for the draining away of water condensed from the exhaust gases.

In a further modification illustrated in Fig. 5, the invention is shown applied to a normal single cylinder gas engine of the horizontal type. In this arrangement, the exhaust gases are led by the pipe $b$ to a silencer $d$. From the silencer $d$ a pipe $u$ leads to a chamber $r$, which may be water-cooled. From the chamber $r$ a pipe $v$ leads to the air inlet pipe $k$. A suitable air suction silencer $w$ may be applied to the end of the pipe $k$. The other end of the pipe $k$ leads to the air controlling cock $y$. The action of this modification is similar to the action of the first described form.

It is to be noted that the cooled exhaust products are introduced at such a point in the air inlet pipe as will insure that in passing through the inlet valve of the engine, the exhaust products shall be thoroughly mixed with the air and gas constituting the remainder of the charge. This is essential in order that the oxygen content shall be uniformly reduced throughout the body of the charge in the engine cylinder.

Claim.

A method of working internal combustion engines, which consists in trapping a portion of the engine exhaust gases, passing these gases through a cooling device, drawing these cooled gases into the engine cylinder, together with air and combustible gas, compressing the mixture and igniting the charge, as and for the purposes described.

In testimony whereof, I affix my signature in presence of two witnesses.

DUGALD CLERK.

Witnesses:
BERTRAM H. MATTHEWS,
J. PHILLIPS HAWLEY.